United States Patent [19]

Schwagerman

[11] 4,410,756
[45] Oct. 18, 1983

[54] FLEXIBLE TYPE MULTIPOINT THERMOCOUPLE ASSEMBLY

[75] Inventor: William H. Schwagerman, McHenry, Ill.

[73] Assignee: Pneumo Corporation, Boston, Mass.

[21] Appl. No.: 402,596

[22] Filed: Jul. 28, 1982

[51] Int. Cl.³ .................. G01K 7/04; H01L 35/02
[52] U.S. Cl. .................... 136/221; 136/201;
136/230; 374/110; 374/208
[58] Field of Search .............. 136/201, 220, 230;
374/110, 208

[56] References Cited

U.S. PATENT DOCUMENTS

| | | | |
|---|---|---|---|
| 3,637,438 | 1/1972 | Springfield | 136/230 |
| 3,939,012 | 2/1976 | Williams | 136/221 |
| 4,098,122 | 7/1978 | Landman et al. | 374/140 X |
| 4,162,175 | 7/1979 | Salt et al. | 136/230 X |
| 4,376,280 | 3/1983 | Davis et al. | 374/167 X |
| 4,385,197 | 3/1983 | Schwagerman | 136/221 |

*Primary Examiner*—Leland A. Sebastian
*Attorney, Agent, or Firm*—Maky, Renner, Otto & Boisselle

[57] ABSTRACT

A multipoint thermocouple assembly for monitoring temperatures at various locations in a utilization environment includes an elongate thermocouple support strap insertable lengthwise into a protective hollow well or the like. Mounted on the support strap are a plurality of thermocouples which are generally held against longitudinal movement relative to the support strap but the respective measuring junctions thereof are supported by respective camming members connected to a common cable for simultaneous longitudinal movement of the camming members relative to the support strap for urging the measuring junctions outwardly into thermally conductive engagement with respective wall portions of the well. The support strap and actuation cable are laterally flexible so that the assembly may be coiled for ease in fabrication, installation and shipping. Each camming member includes an outwardly angled guide tube having opposed camming surfaces operative respectively to force the respective measuring junction outwardly and inwardly upon movement of the actuation cable in opposite directions. During insertion of the assembly into the well or during withdrawal therefrom, the measuring junctions are held out of contact with the inside wall of the well for ease of insertion and removal of the entire assembly from the well without damage to the measuring junctions. Only after full insertion of the assembly into the well are the measuring junctions mechanically and controllably loaded or tensioned against the inside wall of the well. The invention also relates to a multipoint thermocouple assembly/well combination and its method of assembly.

32 Claims, 5 Drawing Figures

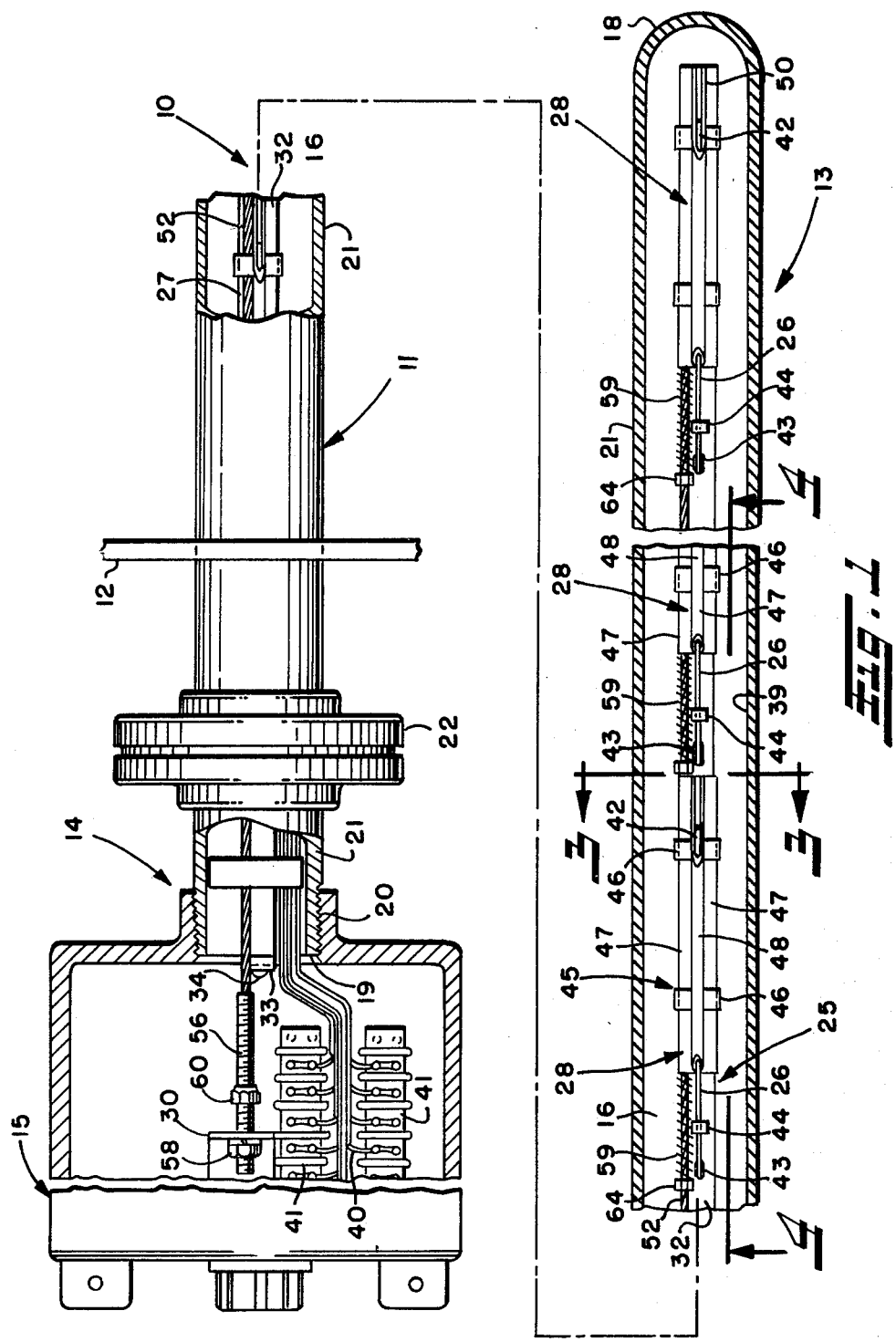

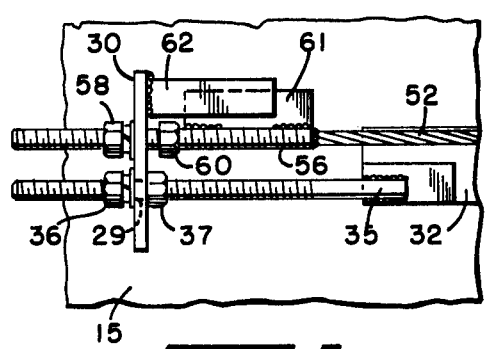
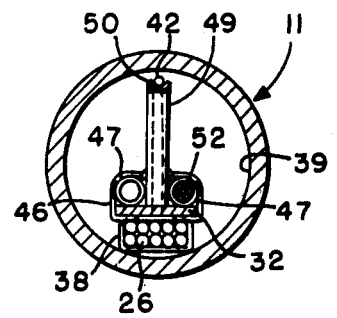
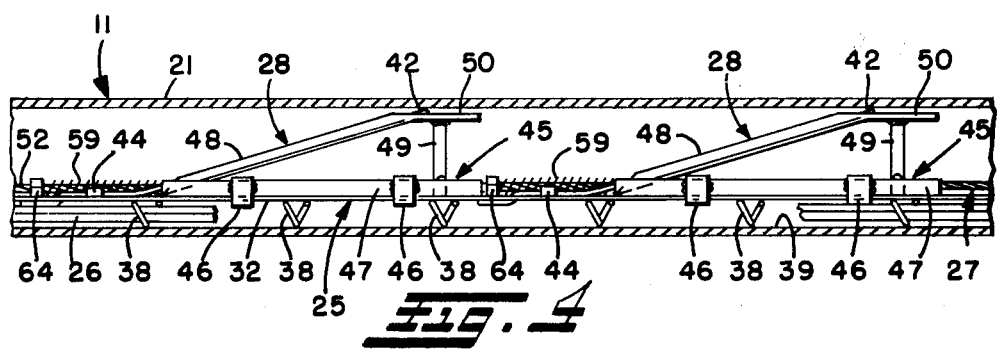
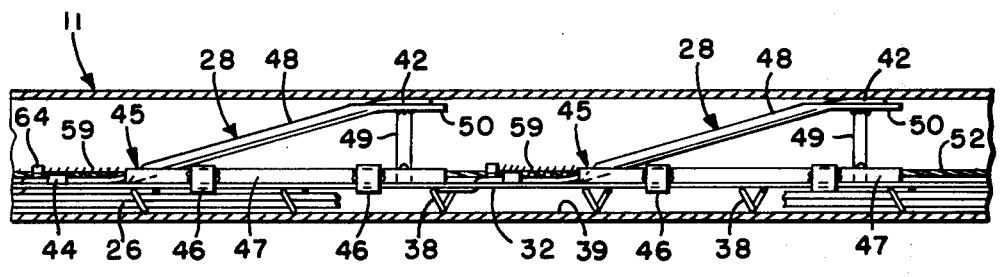

FLEXIBLE TYPE MULTIPOINT THERMOCOUPLE ASSEMBLY

This invention relates generally to multipoint thermocouple assemblies and more particularly to flexible multipoint thermocouple assemblies per se and in combination with protective wells or the like. The invention also relates to a method of forming multipoint thermocouple assembly/well combinations.

BACKGROUND OF THE INVENTION

Multipoint thermocouple assemblies have been used in the past, for example, to obtain information concerning the temperature occurring at different depths or heights in a utilization environment, such as a cracking tower or other process vessel, or the like. Such multipoint thermocouple assemblies may have a length from a few feet to in excess of one hundred feet and are inserted into such process vessel or, more particularly, into a protective well inserted into the process vessel.

A typical known thermocouple assembly includes several thermocouples, each having its measuring junction at a different location along the length of the assembly, and some means for bundling the thermocouples together and for directing their terminating ends to a common junction box for effecting electrical connections to measuring equipment. Usually the measuring junctions and portions of the leads of the thermocouples are contained in a protective tube well that effects such bundling and isolates the thermocouples from the external ambient environment, which may contain corrosives or other material that may affect the thermocouples, for example. Ideally the measuring junctions are held in thermal energy transfer contact with the inside wall of such a protective tube well, so that the thermocouple measuring junctions essentially sense the temperature directly outside of the wall portion of the protective tube well with which they are in contact.

One method of obtaining the desired direct contact of the measuring junctions with the inside wall of the well has been to weld or otherwise fixedly secure the measuring junctions to the inside wall of the well at each location where temperature is to be measured. In addition to the obvious difficulty and special skill and equipment required to effect this method of attachment, undesirable weld effects may result in distorted or specious temperature readings. Moreover, removal of the thermocouples for examination, testing and/or replacement is at best a difficult and time consuming task.

Also known are devices which utilize springs or force exerting components to hold the measuring junctions of the thermocouples against the inside wall of the well. Some devices, for example, employ leaf springs which keep the measuring junctions in an extended condition at all times. Such arrangement however complicates installation of the device into a well, and increases the possibility of damage to the measuring junction during insertion or withdrawal of the device from the well. The springs also are subject to fatigue under prolonged high temperature use which may result in a loss of forcible contact and consequential inaccurate temperature measurement.

Other devices utilizing force exerting components have employed temperature sensitive actuators such as bimetallic springs to effect the desired direct contact. These devices however are relatively expensive and difficult to fabricate. In addition, the contact pressure cannot be controlled very precisely, and may not be adequate if the bimetallic springs are not sufficiently heated. Also, undesirable pressure contact may still be present if the well is heated during insertion and removal of the device.

Another area of concern in the subject art is the inherent difficulty of fabricating and handling multipoint thermocouple devices which, as indicated, may be of substantial length in excess of one hundred feet, for example. Heretofore, flexible devices have been employed which have the advantage that they may be coiled for ease of shipping and installation. Such known flexible devices however typically employ the aforementioned spring actuators and accordingly are subject to the disadvantages associated therewith.

SUMMARY OF THE INVENTION

In accordance with the present invention, controlled loading of the measuring junctions of a multipoint thermocouple assembly against the inside wall of a protective well or the like is mechanically accomplished only after insertion of the assembly into the well and regardless of whether the well is heated or not. Further in accordance with the invention, there is provided a multipoint thermocouple assembly which is light-weight, may be easily fabricated in relatively long lengths, and may be of a flexible or bendable construction for ease of shipping and installation.

Briefly, the multipoint thermocouple assembly comprises an elongate thermocouple support member insertable lengthwise into the protective well or the like, a plurality of thermocouples held in generally parallel relation to the support member and having measuring junctions, an elongate actuation member coextensive with and mounted on the support member for relative longitudinal movement therebetween, and a plurality of relatively short camming members responsive to such relative longitudinal movement for outwardly urging respective measuring junctions of the thermocouples into thermally conductive engagement with respective wall portions of the well. The support member and actuation member preferably are respectively in the form of a laterally flexible support strap and actuation cable so that the assembly may be coiled for ease in fabrication, shipping and installation. Such camming members preferably are slidably mounted on the support strap and connected to the actuation cable for common movement therewith, and each has an outwardly angled guide tube having opposed camming surfaces operative respectively to force the respective measuring junction outwardly and inwardly upon movement of the actuation cable in opposite directions. During insertion of the assembly into the well or during withdrawal therefrom, the measuring junctions are held out of contact with the inside wall of the well for ease of insertion and removal of the entire assembly from the well without damage to the measuring junctions. Only after full insertion of the assembly into the well are the measuring junctions mechanically and controllably loaded or tensioned into contact with the inside wall of the well by actuation of the actuation cable at a location outside of the well.

The invention also provides a multipoint thermocouple assembly/well combination and a method for forming the same.

To the accomplishment of the foregoing and related ends, the invention, then, comprises the features hereinafter fully described and particularly pointed out in the claims, the following description and the annexed drawing setting forth in detail a preferred embodiment of the invention, this being indicative, however, of but one of the various ways in which the principles of the invention may be employed.

BRIEF DESCRIPTION OF THE DRAWINGS

In the annexed drawings:

FIG. 1 is a plan view, partially broken away in section, of an installation embodying a multipoint thermocouple assembly in accordance with the invention;

FIG. 2 is an enlarged partial plan view showing an alternate way of connecting both the support member and actuation member of the thermocouple assembly to a junction box;

FIG. 3 is an enlarged transverse section through the installation of FIG. 1 taken on the plane of the line 3—3 thereof;

FIG. 4 is a partial longitudinal section through the installation of FIG. 1 taken substantially on the plane of the line 4—4 thereof, and showing the assembly in the non-actuated condition thereof; and FIG. 5 is a section similar to FIG. 4 but showing the assembly in the actuated condition thereof.

DETAILED DESCRIPTION

Referring now in detail to the drawings, and initially to FIG. 1, a multipoint thermocouple assembly in accordance with the present invention is indicated generally at 10 and is shown installed in a protective tube-like well structure 11 which in application may be considered a part of an overall assembly or combination. The well 11 in turn is shown installed, for example, in a process vessel 12, only part of a side of which is shown.

As will be apparent, the overall assembly or combination has a sensing end 13 locatable in the process vessel 12 for obtaining information concerning the temperature at various points in the vessel. The assembly also has a terminating or junction end 14 exposed outside of the vessel 12 and may include a junction box 15 through which access to the hollow interior 16 of the well 11 is provided. In the usual case, the multipoint thermocouple assembly and protective well structure will be oriented vertically for measuring temperatures at different elevations within a vessel. However, there may be other applications in which it may be desirable to insert the thermocouple assembly and protective well into the vessel at an angle other than vertical, including horizontally.

The well 11 is formed of material having a relatively high thermal conductivity so that the temperature of the environment outside thereof will be effectively transmitted therethrough and to the inside wall thereof. As illustrated, the well is of an elongate tubular form having a closed bottom end 18 (at the right in FIG. 1) to protect the hereinafter described interiorly located components of the assembly 10 when the sensing end 13 is inserted into the vessel 12 or, more generally, into a utilization environment. The opposite or top end of the well leading into the junction box 15 is open at 19 and may be connected to the junction box as by a threaded connection 20. As also illustrated, the well may be formed of plural hollow tube-like sections commonly designated by reference numeral 21 which, for example, may be coupled together by respective flange connections like the flange connection 22. In this manner, a well of virtually any desired length may be provided.

Referring additionally to FIGS. 3 and 4, the assembly 10 can be seen to include an elongate thermocouple support member 25 insertable lengthwise into the hollow interior 16 of the well 11, a plurality of thermocouples 26 held in generally parallel relation to the support member, an elongate actuation member 27 coextensive with the support member, and a plurality of relatively short camming members 28 spaced along the length of the support member. Although each such component will now generally be described in its installed condition, it should be appreciated that the components are insertable as a unit into the well 11 for subsequent actuation thereof in the below described manner.

Referring first to the support member 25, such preferably includes a relatively thin, laterally flexible support strip or strap 32 of metal or other suitable material which extends from the junction box 15 through the hollow interior 16 of the well 11. The support strap 32 may be of any desired length and normally will extend the full length of the well or at least along the full effective length of the well at which temperatures are to be monitored. At the left in FIG. 1, the support strap is shown as having a bent end or flange 33 secured to the junction box 15 by a fastener 34. Accordingly, the support strap is fixed against longitudinal movement relative to the well which also is secured to the junction box as indicated.

If desired, limited axial adjustment of the support strap 32 within the well may be obtained as by providing a threaded rod 35 on the end of the support strap closest to the junction box 15 as shown in FIG. 2. The rod 35 may extend through an opening 29 in a mounting plate 30 suitably supported in the junction box, with an adjustment nut 36 threaded on its distal end which bears against the mounting plate. By adjusting the position of the nut 36 on the threaded rod 35, the support strap 32 can be moved longitudinally in or out relative to the well as desired. Once the position of the support strap has been set, the support strap may be locked in place by a lock nut 37 threaded on the rod 35 on the side of the mounting plate opposite the adjustment nut 36.

The thermocouples 26 extend from the junction box 15 in generally parallel relation to the support strap 32 and are held in place on one side of the support strap by appropriate means such as wire harnesses 38. The wire harnesses 38 are spaced apart along the length of the support strap and as seen in FIG. 2, have a U- or C-shape configuration when viewed endwise. As illustrated, the open ends of the wire harnesses are secured to a common side of the support strap thereby to form annular enclosures through which the thermocouples 26 pass. In addition to holding the thermocouples to the support strap, the wire harnesses additionally serve as spacers for laterally spacing the support strap from the opposed inside wall 39 of the well 11. For ease in securement of the wire harnesses to the support strap such as by welding and for added rigidity, the legs thereof may be angularly disposed as seen in FIG. 4.

The thermocouples 26 have terminating ends 40 which may be connected to conventional terminal connector blocks 41 or the like housed in the junction box 15. The connector blocks facilitate connecting of the thermocouples to conventional electrical means for obtaining temperature information from the respective thermocouples in the usual manner while the junction box provides a protective area for such connection of the terminating ends 40.

At the ends of the thermocouples 26 opposite the terminating ends 40 are measuring junctions 42 which are located at respective spaced apart points along the length of the support strap 32. As illustrated, the ends of the thermocouples containing the measuring junctions 42 are bent to pass through respective holes 43 in the support strap 32, then along the side of the support strap opposite the wire harness or spacers 38, and then angularly outwardly away from the support strap. Adjacent their angularly outwardly extending end portions, the thermocouples may be secured to the support strap by respective binding straps 44 which hold the thermocouples against longitudinal movement relative to the support strap while permitting relative lateral bending movement of the angularly extending end portions thereof towards and away from the support strap, such movement being effected by the camming members 28 as described hereafter.

One such camming member 28 is provided at the measuring junction 42 of each thermocouple 26. Each camming member includes a fabricated base 45 that is slidably mounted on the support strap 32 as by two C-clips 46. The base 45 includes two spaced apart parallel tubes 47 which have secured therebetween an angled or inclined guide tube 48 which captures and angularly outwardly directs the measuring junction end of the respective thermocouple away from the support strap. The guide tube slopes outwardly away from the support member traveling in the insertion direction of the assembly, i.e., from left to right in FIGS. 1, 4 and 5, and is supported at its outermost end by a diametrically extending bracket or post 49 secured at its inner end between the tubes 47. Actually the bracket supports a short axial extension 50 at the outermost end of the guide tube which is closely spaced from the inside wall 39 of the well 11.

The camming members 28 are commonly connected to the actuation member 27 which, as illustrated, includes a laterally flexible wire cable 52 coextensive with the support strap 32. The wire cable 52 desirably extends through a common one of the tubes 47 forming the bases 45 of the camming members, and the noted connections may be effected for example by welding. As each camming member is secured to the cable but at a different location along the length thereof, longitudinal movement of the cable relative to the support strap will effect like common movement of the camming members.

Although any suitable means may be employed to effect longitudinal movement of the cable 52 relative to the support strap 32, preferably the cable is connected at its end adjacent the junction box 15 to a threaded rod 56. The rod 56 extends through an opening in the mounting plate 30 suitably supported in the junction box as aforesaid and has an adjustment nut 58 threaded on its distal end which bears against the mounting plate. By rotating the nut 58 in one direction, the rod and thus the cable will be pulled to the left in FIG. 1 toward the junction box whereas rotation in the other direction permits the cable to be urged to the right away from the junction box by the hereinafter described tensioning springs 59.

The cable 52 may be prevented from turning as the nut 58 is turned when tightening the cable and creating the longitudinal force and movement which actuates all of the camming members 28 as by providing a plate 61 along a portion of the length of the rod 56. The plate 61 extends radially outwardly from the rod 56 and overlaps another plate 62 depending from the mounting plate 30 so that the cable cannot rotate and possibly lose its tightly twisted configuration as the nut 58 is turned when tightening the cable as aforesaid.

In any actuated or adjusted position of the cable, the rod 56 may be locked in place by a lock nut 60 threaded on the rod on the side of the mounting plate opposite the adjustment nut. Easy access to the adjustment and locking nuts may be obtained through an access opening provided in the front side of the junction box 15.

As indicated, the actuation cable 52 is biased to the right in FIG. 1 by tensioning springs 59, there being one associated with each camming member 28. Preferably such tensioning springs are of the coil type and are positioned on the cable intermediate the associated camming member and a stop 64 fixed to the cable above or to the left of the respective camming member as shown in FIG. 1. Accordingly, the springs resiliently urge the camming members and thus the cable downwardly or to the right to the non-actuated position seen in FIG. 4.

When the camming members 28 are in such non-actuated position, the measuring junctions 42 preferably will be substantially retracted into the guide tubes 48 out of pressure engagement with the inside wall of the well. As a result, the measuring junctions of the thermocouples 26 will be protected against damage which might otherwise occur if constant pressure was continuously applied to the measuring junctions urging them against the inside walls 39 of the well during insertion of the assembly into the well or withdrawal therefrom.

Once properly inserted and positioned in the well 11, the assembly 10 may be actuated by pulling the actuation cable 52 toward the junction box to cause such cable to move to the left in FIG. 1 relative to the support strap 32 as by rotating the adjustment nut 58 in the proper direction. This in turn will cause the camming members 28 to move along the support strap in the same direction, which causes the measuring junction ends of the thermocouples 26 to slide out of the respective guide tubes 48 and be outwardly urged or cammed thereby into firm contact with the adjacent inside wall portion of the well 11 and into thermally conductive engagement therewith. When the assembly is thus assembled and actuated as seen in FIG. 5, each measuring junction will be at the temperature of the proximate environment directly outside the associated wall portions of the well, and will provide electrical signals which may be sensed by electrical equipment coupled to each of the terminating ends thereof.

In order to prevent overloading or tensioning of the measuring junctions 42 against the inside wall of the well 11 at the installation site, the lock nut 60 may additionally serve as a stop limiting travel of the cable 52 to that required to obtain the desired loading or tensioning. That is, the position of the lock nut 60 on the rod 56 may be preset at the factory, for example, so that during installation of the assembly into a well, proper actuation movement of the cable 52 will be obtained upon the lock nut 60 being brought into abutment with the plate 57. Of course, in order to do that the position of the support strap within the well should also be preset at the factory.

It also should be appreciated that the lock nut 60 may be adjusted from its preset position to permit more or less outward movement of the measuring junction ends to accommodate wells having different inner diameters. The extent of adjustment, however, normally will not be great as it is preferred to provide different sizes of assemblies for use in wells having corresponding inner diameters.

To remove the assembly from the well 11, the foregoing assembly process is simply reversed. That is, the adjustment nut 58 is rotated in the opposite direction to permit the cable 52 to be urged to the right in FIG. 1 away from the junction box by the tensioning springs 59. At the same time, the camming members 28 will return to their non-actuated position of FIG. 4, and in so doing, the measuring junctions 42 will become slidably retracted into the guide tubes 48 thus removing the pressure of the thermocouples against the well I.D. and allowing for the free removal of the entire assembly from the well.

From the foregoing, it will be apparent that the guide tubes 48 in effect provide opposed sloped camming surfaces which are operative to urge the measuring junctions outwardly or inwardly depending on the direction of movement of the camming members 28. Of course, it should be apparent that other suitable means having functionally equivalent camming surfaces may be employed with desirable results. Also, only a single tensioning spring 59 may be effectively employed at the end of the cable 52 opposite the junction box 15 to maintain the desired tensioning of the cable to its non-actuated position.

It further will be appreciated that the leftward and rightward directional extents mentioned herein are used to facilitate description of the invention. However, such directional references are used by way of example only, and it will be appreciated that the assembly 10 may be positioned for use with the well 11 extending vertically, horizontally, or in any other angular orientation, as desired. Moreover, the number of thermocouples 26 used in the assembly may be varied, as desired, and the locations of the respective measuring junctions 42 and camming members 28 may be chosen as desired.

The flexibility of the support strap 32 and cable 52 provide for ease in fabrication, shipping and installation. For example, a relatively large length of the assembly may be coiled to provide a relatively small, easily handled package.

Although the invention has been shown and described with respect to a preferred embodiment, it is obvious that equivalent alterations and modifications will occur to others skilled in the art upon the reading and understanding of the specification. The present invention includes all such equivalent alterations and modifications, and is limited only by the scope of the following claims.

The embodiments of the invention in which an exclusive property or privilege is claimed are defined as follows:

1. A multipoint thermocouple assembly useful in an axially elongate hollow well for monitoring temperatures at various locations in a utilization environment, comprising an elongate thermocouple support member insertable lengthwise into the well, a plurality of thermocouples held in generally parallel relation to said support member and having measuring junctions, an elongate actuation member coextensive with and mounted on said support member for relative longitudinal movement therebetween, and means responsive to such relative longitudinal movement for urging the measuring junctions of said thermocouples away from said support member and into thermal conductive engagement with respective wall portions of the well.

2. An assembly as set forth in claim 1, wherein said means for urging includes plural camming members slidably mounted on said support member and connected to said actuation member for common movement therewith, said camming members having camming surfaces operative to force respective measuring junctions of said thermocouples outwardly into contact with the respective wall portions of the well.

3. An assembly as set forth in claim 2, wherein said camming surfaces are outwardly angled with respect to said support member.

4. An assembly as set forth in claim 2, further comprising harness means on said support member for holding said thermocouples to said support member.

5. An assembly as set forth in claim 1, wherein said means for urging includes plural camming members slidably mounted on said support member and connected to said actuation member for common movement therewith, said camming members having opposed camming surfaces operative upon movement in one direction to force respective measuring junctions of said thermocouples outwardly into contact with respective wall portions of the well and upon movement in the opposite direction positively to urge respective measuring junctions inwardly to clear the wall of the well.

6. An assembly as set forth in claim 5, wherein means are provided for resiliently urging said camming members in such opposite direction.

7. An assembly as set forth in claim 6, wherein said means for resiliently urging includes plural springs acting on respective camming members to effect such urging of said camming members in such opposite direction.

8. An assembly as set forth in claim 5, wherein said camming members include respective guide tubes for respective measuring junctions of said thermocouples, said guide tubes being outwardly angled with respect to said support member and having opposed interior surfaces forming said opposed camming surfaces.

9. An assembly as set forth in claim 1 in combination with said well, said well comprising an axially elongate tube having an open end and a closed end positionable in a utilization environment for sensing of temperatures in the latter by said thermocouples, and mounting means at such open end for mounting said tube and support member.

10. An assembly as set forth in claim 9, wherein said tube and support member are in fixed position relative to said mounting means, and means are provided at such open end of said tube for effecting longitudinal movement of said actuation member relative to said tube and support member.

11. An assembly as set forth in claim 1, wherein said means for urging includes plural ramps slidably mounted on said support member and connected to said actuation member for common movement therewith, said ramps having outwardly angled surfaces slidably laterally supporting the ends of respective thermocouples containing said measuring junctions.

12. An assembly as set forth in claim 1, wherein said support member and actuation member are laterally flexible.

13. An assembly as set forth in claim 12, wherein said support member includes an elongate flexible strap and said actuation member includes an elongate flexible cable mounted on said strap for longitudinal movement with respect thereto.

14. An assembly as set forth in claim 13, further comprising harness means for holding said thermocouples in place on said support member, said harness means including a plurality of longitudinally spaced brackets, said brackets being secured to a common side of said strap and serving laterally to space said strap in the well.

15. An assembly as set forth in claim 1, further comprising means for laterally spacing said support member in the well.

16. An assembly as set forth in claim 15, wherein said means for laterally spacing includes a plurality of longitudinally spaced brackets secured to said support member.

17. An assembly as set forth in claim 16, wherein said brackets collectively hold said thermocouples to said support member.

18. An assembly as set forth in claim 1, wherein said means for urging includes plural means mounted on said support member and connected to said actuation member for forcing respective measuring junctions of said thermocouples outwardly into contact with respective wall portions of the well in response to such relative longitudinal movement.

19. An assembly as set forth in claim 1, further comprising the well, said well having an open end and a closed end, and a junction box at such open end having a hollow interior portion for receiving terminal ends of said thermocouples, and means for connecting said well and box together.

20. An assembly as set forth in claim 19, further comprising means for fixedly mounting said support member to said box, and means at said box for effecting longitudinal movement of said actuation member relative to said support member.

21. A method of forming a multipoint thermocouple assembly/well combination, comprising the steps of inserting the assembly of claim 1 into the well, and then effecting such relative longitudinal movement between the support member and actuation member to urge the measuring junctions of the thermocouples into thermal conductive engagement with respective wall portions of the well.

22. A method of forming a multipoint thermocouple assembly/well combination and then removing the multipoint thermocouple assembly from the well, comprising the steps of inserting the assembly of claim 5 into the well, then effecting such movement of the actuation member and camming members in one direction to force respective measuring junctions of the thermocouples outwardly into contact with respective wall portions of the well, thereafter effecting such movement of the actuation member and cam members in the opposite direction positively to urge the respective measuring junctions inwardly to clear the wall of the well, and then removing the assembly from the well.

23. A thermocouple assembly useful in a well for measuring temperature, comprising an elongate thermocouple support member insertable into the well, thermocouple means extending along the support member and having a measuring junction, an elongate actuation member coextensive with and mounted on said support member for relative longitudinal movement therebetween, and means responsive to such relative longitudinal movement for urging said measuring junction away from said support member and into thermal conductive engagement with the inside wall of the well.

24. An assembly as set forth in claim 23, wherein the well has an open end through which said support means is inserted, and further comprising means locatable at such open end of the well for effecting such relative longitudinal movement.

25. An assembly as set forth in claim 24, wherein said means for effecting such relative longitudinal movement includes means for moving said actuation member relative to said support member while said support member is held in fixed position relative to the well.

26. An assembly as set forth in claim 23, further comprising stop means for limiting such relative longitudinal movement to prevent overloading of said measuring junction against the inside wall of the well.

27. An assembly as set forth in claim 25, wherein said support member includes an elongate flexible strap and said actuation member includes an elongate flexible cable mounted on said strap for longitudinal movement with respect thereto.

28. An assembly as set forth in claim 27, wherein said means for moving said cable relative to said flexible strap comprises a threaded rod connected to said cable, a stationary member through which said rod extends, and an adjustment nut threaded on said rod which when tightened pulls said cable towards said stationary member.

29. An assembly as set forth in claim 28, further comprising means for preventing turning of said cable during tightening of said nut.

30. An assembly as set forth in claim 29, wherein said means for preventing turning of said cable comprises a first plate extending radially outwardly from said rod, and a second plate depending from said stationary member in overlapping relation to said first plate.

31. An assembly as set forth in claim 27, further comprising means for adjusting the axial position of said flexible strap in the well.

32. An assembly as set forth in claim 31, wherein said means for adjusting the axial position of said flexible strap comprises a threaded rod connected to said strap, a stationary member through which said threaded rod extends, and an adjustment nut threaded on said rod which bears against said stationary member.

* * * * *